United States Patent Office 3,077,267
Patented Feb. 12, 1963

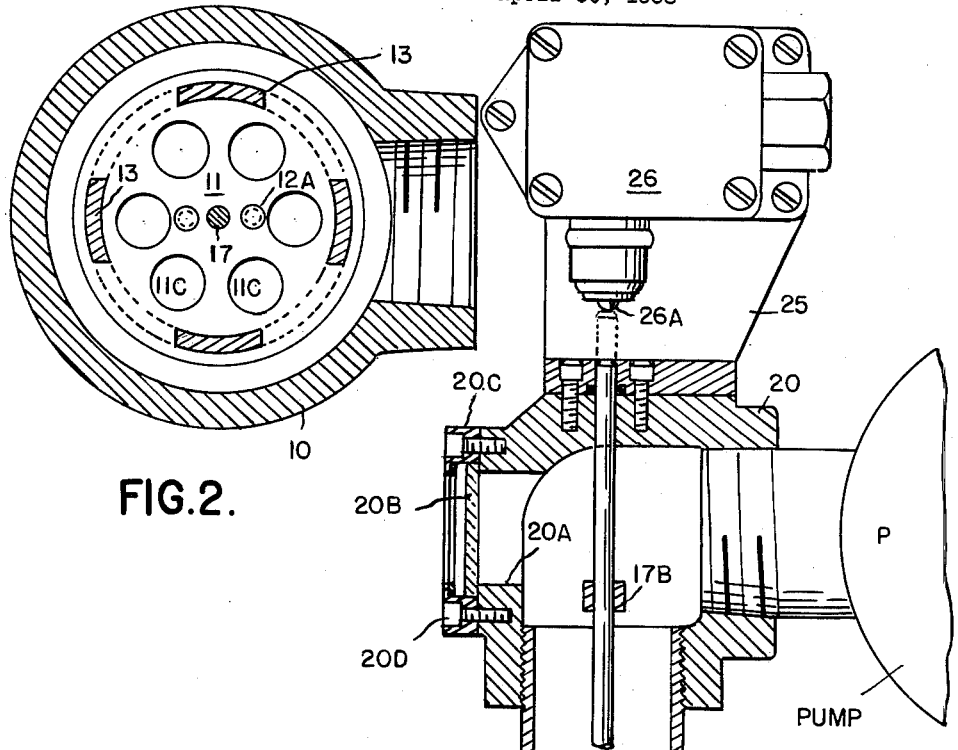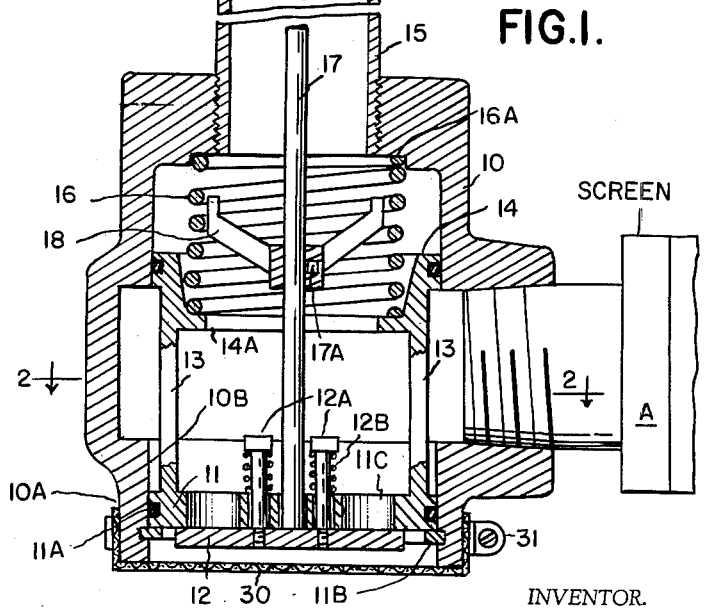

3,077,267
OIL FILTER OUTLET
Nils O. Rosaen, Detroit, Mich., assignor to The Rosaen Filter Company, Hazel Park, Mich., a corporation of Michigan
Filed Apr. 30, 1958, Ser. No. 732,058
3 Claims. (Cl. 210—90)

The present invention relates to oil screens or filters and more particularly to outlet means for such screens having combined therewith means to indicate the condition of the screen.

In industrial installations where a considerable volume of oil is circulated from a supply tank to its point of use and back to the tank, it is desirable to remove dirt, grit, metal particles or the like from such oil before it is recirculated. This is usually done by settling and screening the oil as it passes to the circulating pump.

However, such screens gradually become clogged and as the clogging increases, the flow of oil decreases or the power required for the pump increases or both. This condition is not always evident.

Among the objects of the present invention is to provide means for detecting such a condition and give a warning before the clogging has proceeded to an objectionable degree.

Another object is to provide such a means with either an audible or visual signal or both.

Still other objects will readily occur to those skilled in the art upon reference to the following description and the accompanying drawings in which FIGURE 1 is a vertical central sectional view of the device.

FIG. 2 is a section on line 2—2 of FIGURE 1.

In the drawing there is indicated at A a common form of oil screen adapted to be submerged in a body of oil in a suitable tank not shown). The screen in the present device is mounted to discharge horizontally, the oil being drawn through the screen and up through the device shown by means of a pump P of suitable design.

The oil from screen A flows into a vertically arranged substantially cylindrical casing 10 having the oil inlet from the screen intermediate its height.

In the top of the casing 10 is fixed a vertical pipe or tube 15 and this is provided at its upper end with an elbow member 20 to which is secured the inlet conduit of the pump P. As shown, the casing 10 is a T-fitting with the stem constituting the oil inlet from screen A. The cross member of the T-fitting is arranged vertically and its end opens to the pipe 15 which is coaxial therewith.

The lower end 10A of the T-fitting is finished to provide a cylinder 10B in which is mounted a piston 11 shown as provided with a suitable packing ring 11A and limited in its downward movement by a suitable snap ring 11B. Piston 11 is shown in plan in FIG. 2 and consists of a disc provided with a plurality of openings 11C. It also carries on its underside a plate valve 12 of sufficient size to close the openings 11C, the valve being fixed to pins 12A slidable in suitable openings in piston 11 and maintained in closed position by suitable springs 12B acting between the piston disc and the heads of pins 12A.

Piston 11 is connected through preferably integral arms 13 to a guide ring 14 slidably mounted in the T-fitting 10 above the oil inlet and provided with a suitable shoulder 14A serving as a seat for a spring 16, the other end of which abuts a suitable shoulder 16A in the fitting, being located around and adjacent the opening for pipe 15. Spring 16 will be under compression to hold the piston 11 and guide ring 14 in their lowest position.

Fixed to the valve 12 and extending up coaxially through fitting 10, pipe 15 and elbow 20 is a rod 17, being slidable in a suitable bearing in the upper wall of the elbow 20. Adjustably fixed to the rod 17 by means of a suitable set screw 17A, is a spider 18 having upwardly extending arms in position to contact the shoulder 16A.

The elbow fitting 20 fixed to the top of pipe 15 diverts the oil to inlet of pump P, and as stated above, provides a bearing in its upper wall for the slidable rod 17. Opposite the outlet to the pump P. is an opening 20A in which is set a window 20B, this being preferably held in place by means of a suitable ring 20C affixed by screws 20D.

Fixed to the upper wall of elbow 20 is a bracket 25 serving as a support for a suitable signalling means, indicated in the drawing as an electric switch 26 having an actuating plunger or button 26A aligned with the rod 17 and so located that it will be actuated by the rod when the latter is moved to its upper position. The switch, of course, may be used to cause the illumination of a light signal or energize a circuit for an audible alarm or both (these not being shown).

In addition to the switch 26, the rod 17 may have fixed to it, in position to be seen through window 20B, a small collar or other element 17B, which may be of distinctive color, if desired. The position of element 17B will of course indicate the position of the rod 17.

In the operation of the device, so long as the screen A is clean, no effect will be noted, but as the screen becomes gradually clogged, the pressure in the line between screen and pump decreases. When the pressure drops sufficiently, the piston 11 will be lifted against the pressure of spring 16 and will gradually rise as the clogging progresses and the pressure between the screen and pump continues to decrease until the spider 18 strikes the shoulder 16A.

In the meantime, the rod 17 has moved up sufficiently to actuate the switch 26. When, however, the spider 18 strikes the shoulder 16A, a further movement of the piston 11 causes it to move away from the valve 12 which is held stationary by the rod 17, thus providing for entrance of oil through the bottom of fitting 10 and the bypassing of the screen or filter A. The bottom of fitting 10 is preferably covered with a suitable screen 30, held in place by a clamping band or collar 31.

I claim:

1. Means for screening oil being circulated from a reservoir to a place of use and back to said reservoir and including a pump and a submerged horizontally arranged screen, said means including a T-fitting having its stem portion connected to and receiving oil from said screen and having the cross arm of the T-fitting arranged with its axis vertical, an oil conduit leading vertically from the upper end of said fitting, an oil screen over the lower end of said fitting, a perforated piston mounted in the lower end of said fitting, a valve plate on the underside of said piston and covering the perforations, a rod fixed to said plate and passing slidably through said piston and axially through said conduit, closure means for the upper end of said conduit, means for connecting the upper end of said conduit to said pump, said rod extending slidably through said closure means, signal means actuable by the extended end of said rod for indicating the condition of said first mentioned screen and means also carried by said rod for opening the valve in said piston to bypass oil directly through said second mentioned screen into said T-fitting and oil conduit to said pump.

2. In combination with a submerged oil screen and oil circulating pump, a vertical conduit connecting the screen and pump and having its lower portion also submerged, said conduit comprising a portion extending below the screen connection and constituting a cylinder open at its lower end, an oil screen over said lower end, a piston slidably mounted in said cylinder and provided with an outwardly opening valve, a rod fixed to said valve and extending loosely through said piston and into said conduit, signalling means mounted at the top of said conduit and actuable by said rod to indicate the condition of said first mentioned submerged oil screen, and means also carried by said rod for opening said valve when said signalling means is actuated to bypass oil through said lower end into said conduit.

3. In combination with a submerged oil screen and oil circulating pump, a vertical conduit connecting the screen and pump and having its lower portion also submerged, said conduit comprising a portion extending below the screen connection and constituting a cylinder open at its lower end, a piston slidably mounted in said cylinder and provided with an outwardly opening valve, a rod fixed to said valve and extending loosely through said piston and into said conduit, closure means for the top of said conduit providing pump connecting means and through which said rod extends, signal means for indicating a clogged condition of said submerged oil screen mounted on said closure means in position to be actuated by the rod extension, means carried by said rod for opening said valve when said signal means is actuated, and means for indicating the position of said rod before said signal means is actuated.

References Cited in the file of this patent

UNITED STATES PATENTS

| | | |
|---|---|---|
| 882,393 | Kramer | Mar. 17, 1908 |
| 2,134,061 | Thomas | Oct. 25, 1938 |
| 2,400,200 | Katcher | May 14, 1946 |